United States Patent [19]

Miyata et al.

[11] Patent Number: 4,999,495

[45] Date of Patent: Mar. 12, 1991

[54] SCANNING TUNNELING MICROSCOPE

[75] Inventors: Chikara Miyata; Masatoshi Yasutake; Hiroshi Ishijima, all of Tokyo, Japan

[73] Assignee: Seiko Instruments Inc., Japan

[21] Appl. No.: 399,910

[22] Filed: Aug. 29, 1989

[30] Foreign Application Priority Data

| Aug. 31, 1988 [JP] | Japan | 63-217491 |
|---|---|---|
| Dec. 19, 1988 [JP] | Japan | 63-320184 |
| Dec. 19, 1988 [JP] | Japan | 63-320185 |

[51] Int. Cl.$^5$ .................................... H01J 37/26
[52] U.S. Cl. .......................... 250/306; 250/310; 250/311; 250/423 F; 250/491.1
[58] Field of Search .............. 250/306, 309, 310, 311, 250/423 F, 281, 288; 350/520

[56] References Cited

U.S. PATENT DOCUMENTS

| 3,514,595 | 5/1970 | Schwarz et al. | 250/311 |
|---|---|---|---|
| 3,840,721 | 10/1974 | Monk | 250/492.21 |
| 4,128,765 | 12/1978 | Franks | 250/492.21 |
| 4,151,418 | 4/1979 | Kenessey | 250/310 |
| 4,349,242 | 9/1982 | Ogura | 250/310 |
| 4,537,477 | 8/1985 | Takagi et al. | 250/310 |
| 4,656,358 | 4/1987 | Divens et al. | 250/492.2 |
| 4,745,277 | 5/1988 | Banar et al. | 250/288 |
| 4,807,979 | 2/1989 | Saccomanno et al. | 350/520 |

Primary Examiner—Janice A. Howell
Assistant Examiner—Kiet T. Nguyen
Attorney, Agent, or Firm—Bruce L. Adams; Van C. Wilks

[57] ABSTRACT

In a tunneling unit of a scanning tunneling microscope (STM), a rough feed mechanism for approaching a sample and a probe to a tunnel area is disposed separately (or is provided to a stage on a sample side, for example), a fine movement element block is formed as a separate unit and the tunnel unit main body is made compact and provided with high rigidity so that it can be mounted to an optical microscope or a laser microscope. If the fine movement element block of the tunnel unit is mounted to a revolver of an optical microscope or the like, rotation positioning accuracy of the revolver is a few microns. Therefore, high precision positioning of the position to be observed by STM can be attained by optical means and measurement having high resolution in an nm order can be conducted by use of STM. Since STM can be mounted to an existing apparatus in accordance with the present invention, measurement accuracy can be improved drastically and the invention is extremely useful industrially.

6 Claims, 9 Drawing Sheets

SCANNING TUNNELING MICROSCOPE

BACKGROUND OF THE INVENTION

This invention relates to a scanning tunneling microscope.

FIG. 2 shows an example of conventional STM apparatuses. A fine movement element block 1 having the construction wherein a probe 102 is disposed at the end portion of a fine movement element 101 is fitted into a cylindrical member 11 slidably in the axial direction of the cylinder. The fine movement element 101 can extend and contract in a Z-direction (in the axial direction of the fine movement element 101) or can be bent in X-Y direction by electrical stimulus.

A rough feed mechanism 10 consists substantially of a step motor 12 and a feed screw 13 connected to the output shaft of this motor. The feed screw 13 is fitted to the fine movement element block 1. Accordingly, where the feed screw 13 of the rough feed mechanism 10 rotates, the fine movement element block 1 is moved in the axial direction with respect to the cylindrical member 11.

A sample 5 is held by a sample holder 51, which is fitted and fixed to the front end surface of the cylindrical member 11.

To measure the sample by the probe, therefore, the fine movement element block 1 is fed roughly in the sample direction while the fine movement element 101 is being driven and rough movement is stopped at a position where a tunnel current is detected. Next, the fine moving element 101 is driven in the inner plane direction of the sample to make measurement. In this manner, rough movement, fine movement and the sample are integrated with one another in accordance with the prior art technique.

The STM apparatus is an apparatus which has resolution of an atomic level. Recently, the use of the STM apparatus for the observation of fine surface shapes in a micron meter range has been started. Though having high resolution, the STM apparatus is also characterized in that its maximum observation range is as narrow as about 10 μm. It is therefore extremely difficult to locate the observation range to the place of a sample to be observed (such as a scratch) by use of the STM apparatus alone. Even in an STM apparatus equipped with a precision sample moving table (e.g. "Development of STM Apparatus Equipped with Sample Moving Stage", Technical Paper of Fall Meeting of '88 Precision Engineering Society, pp. 907), rough positioning is made from an obliquely transverse direction and STM measurement is repeated by moving finely the sample by the precision moving table in order to make positioning on the trial-and-error basis. It has therefore become necessary to position a desired measurement position of the sample by optical observation means and then to position the STM measurement area to this position.

SUMMARY OF THE INVENTION

An object of the present invention is to provide an STM apparatus which is capable of searching and locating an area to be observed with high orecision.

Another object of the present invention is to provide an STM apparatus which is attached to an optical microscope (laser microscope).

A further object of the present invention is to provide an STM apparatus which has an optical micriscope (laser microscope).

Other and further objects, feature and advantages of the invention will appear more fully from the following description.

The present invention reduces the size and weight of the tunnel unit while keeping its high rigidity and makes it possible to compose the tunnel unit with other means, particularly such as an optical microscope and laser microscope. In other words, the present invention separates a rough feed mechanism from the tunnel unit and makes it possible to fit the tunnel unit having a fine movement element block to other appliances. In the present invention, rough feed for approaching the sample and the probe to tunnel area is carried out by use of a Z-axis moving stage on the sample side or by moving the lens-barrel of the optical microscope.

Since the tunnel unit is made compact as described above, it can be fitted to the revolver and the like of the optical microscope or the laser microscope.

DETAILED DESCRIPTION

Embodiment

Figure 1:
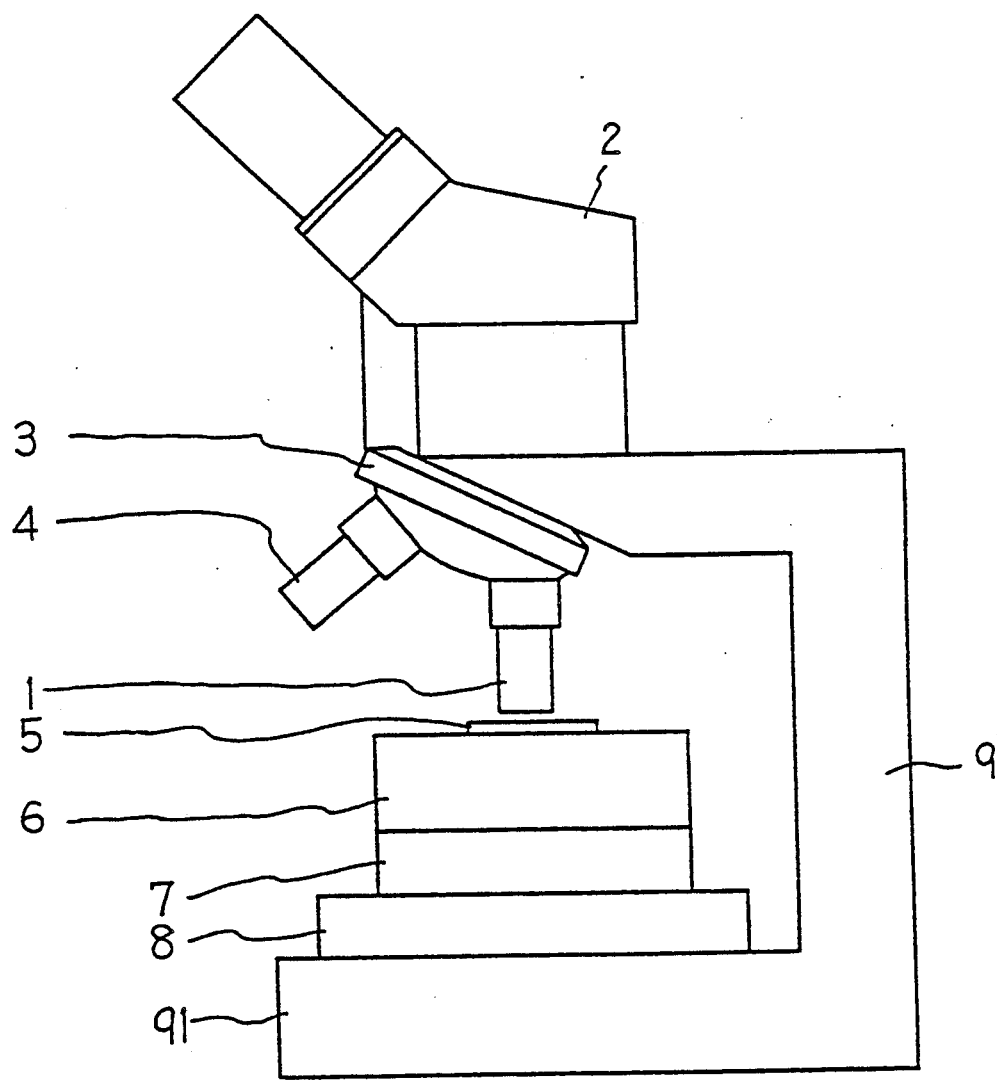
FIG. 1 shows an embodiment of the present invention.
Figure 2:
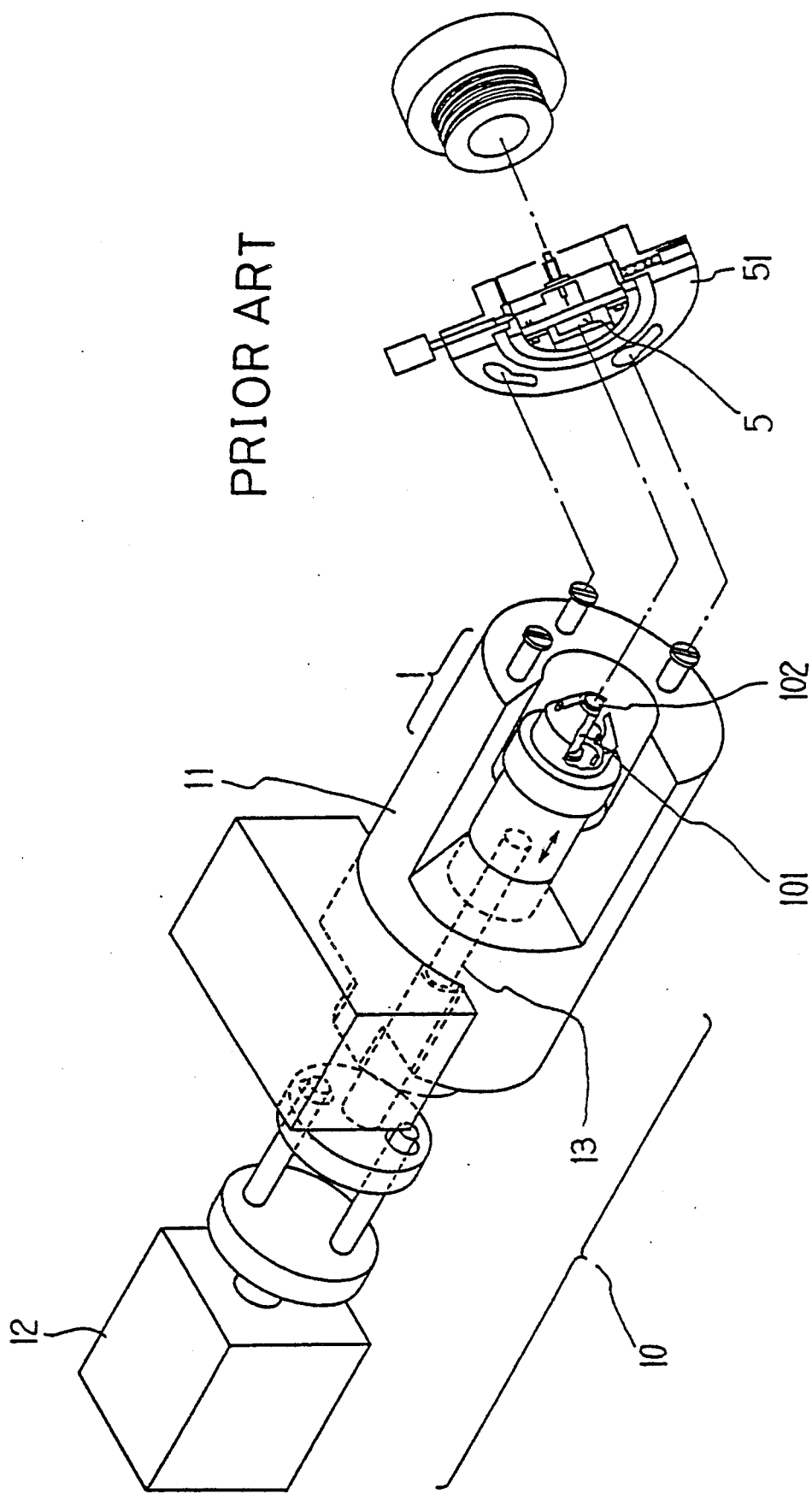
FIG. 2 shows a prior art example.

FIG. 1 shows an embodiment of the present invention when the fine movement element block is fitted to the revolver of the optical microscope or the laser microscope. A fine movement element block 1 as the principal element of the tunnel unit is fitted to the revolver 3 together with an objective lens 4. The revolver 3 and the lens-barrel 2 of the optical microscope are supported by an arm 9 and a Z-axis table 6 is disposed on a sample stage of the arm 9 through an X-axis table 7 and a Y-axis table 8 in such a manner as to face the revolver 3. The sample 5 is fixed to the Z-axis table 6. The Z-axis table 6 can move in a vertical direction (in the Z-axis direction) and a minimum moving distance is determined by the moving distance of the fine movement element block 1 in the Z-axis direction. If the Z-axis moving distance is 3 μm, for example, it is below one micron.

Next, the method of determining the sample observation position by the optical microscope and conducting STM measurement of that position will be explained.

A positioning sample having irregular patterns is first subjected to the STM measurement. The positions of the X- and Y-tables at this time are called $(X_0, Y_0)$.

At this position, the Z-axis table is lowered and the revolver 3 is rorated so that optical observation can be made by the objective lens 4 of the optical microscope. Focusing is made by the Z-axis table and the X-Y tables are moved so that the image obtained by the STM measurement reaches the center of a cross-cursor inside the observation field. If the positions of the X-Y tables are $(X_1, Y_1)$, $(X_0 - X_1, Y_0 - Y_1)$ is the offset (deviation) of the STM probe from the center position of the cross-cursor.

Next, the sample is replaced by another which is to be measured, and the desired measurement position is located to the position of the cross-cursor at the time of the optical microscope observation.

The Z-axis is lowered and the revolver is rotated so that the fine movement element block 1 comes on the sample. The offset $(X_0 - X_1, Y_0 - Y_1)$ is corrected and auto-approach is made for measurement. In other words, the sample and the probe are approached by the Z-axis table for STM measurement. In this manner, the place positioned by the objective lens and the cursor can be subjected to the STM measurement.

The position error between the objective lens and the probe depends greatly on the production accuracy of the probe. Therefore, the offset $(X_0 - X_1, Y_0 - Y_1)$ must be determined whenever the probe is replaced. Any samples can be used as the sample for positioning so long as they have the irregular pattern shapes, such as pits of an optical disk, for example.

The following two procedures can be employed for the STM measurement. The first procedure is as follows.

(1) Servo action is applied to the fine movement element 101 and while the element 101 is kept stretched, the Z-axis table 6 is approached thereto by fine step by step.
(2) When the sample 5 and the probe 102 approach to each other and a tunnel current is detected, rough feed by the Z-axis table 6 is stopped.

In this case, rough feed by the Z-axis table 6 must be controlled by a fine quantity and with high response lest the sample 5 and the probe 102 approach excessively and impinge against each other while the fine movement element 101 extends and contracts, so that the distance between the sample 5 and the probe 102 becomes constant by a predetermined tunnel current value by detecting the tunnel current. If the moving distance of the fine movement element 101 in the Z-axis direction is about 0.5 μm, a minimum moving distance of some dozens of nm is necessary.

The second procedure is as follows.
(1) Servo action is applied.
(2) Rough feed is stopped when the tunnel current is detected.
(3) Servo action is cut off and the fine movement element 101 is contracted.
(4) Rough feed by a small distance is made by the Z-axis table 6.
(5) The step returns to (1).

In this case, through movement of the Z-axis stage 6 can be made by a distance about a half of the moving distance of the fine movement element 101. In order to detect the tunnel current at a desired position within the range of the impressed voltage to the fine movement element 101, however, it is necessary to reduce the minimum moving distance of the Z-axis moving stage and to correct by determining the correction moving distance of the Z-axis moving stage from the voltage of the fine movement element 101 applied at the moment. This value is in the order of some dozens of nm in the same way as described above.

In the construction described above, the X-Y tables 7, 8 are for moving the sample, but they must be constructed so that overall rigidity, i.e., rigidity between the fine movement element block 1 and the sample 5, that is, fitting rigidity to the revolver 3, fitting rigidity to the arm 9, rigidity of the main body of the arm 9 and rigidity of the tables 6, 7, 8 must have rigidity necessary as STM, or in other words, the overall intrinsic frequency must be above several killo-Hertz.

The stages 6, 7, 8 used hereby may be either of a manual type or an electric type. In view of operabability, however, the electric type is preferred, and a construction capable of auto-focusing to the optical microscope can be attained.

Figure 3:
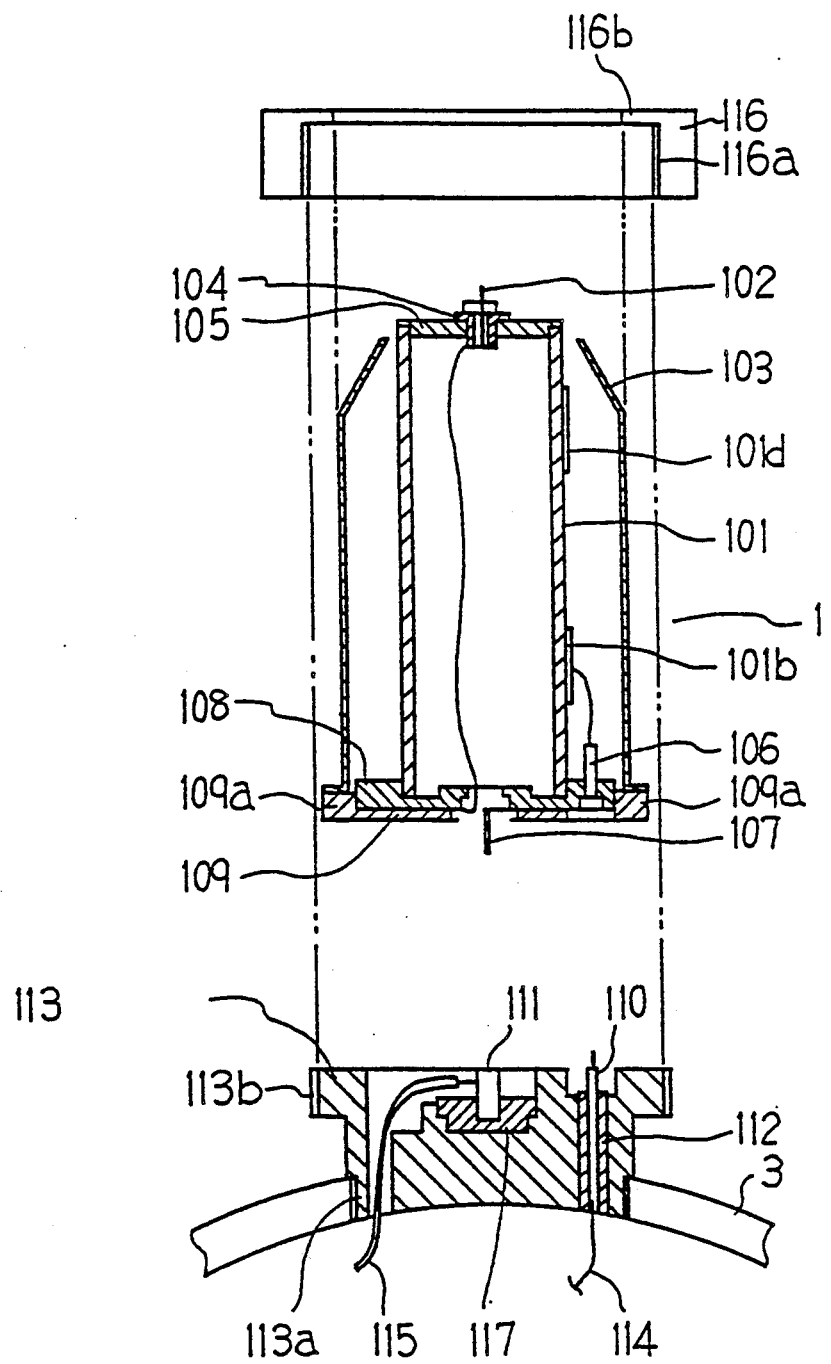
FIG. 3 is an exploded explanatory view of a fine movement element block.

Next, the fine movement element block will be explained with reference to FIG. 3.

The probe 102 for detecting the tunnel current is removably screwed into the probe holder 104 and the probe holder 104 is fixed to an insulating seat A105 by an adhesive or the like. The insulating seat A105 is in turn fixed to the cylindrical fine movement element 101 by adhesive. The other end of the fine movement element 101 is fixed to the support plate 109 by the adhesive or the like through an insulating seat B108. At least four contact pines A106 connected to lead wires for driving the fine movement element 101 and one contact pin B107 connected to the lead wire in the same way as the signal of the probe 102 from the probe holder 104 are supported insulatedly by the insulating seat B108.

Figure 4:
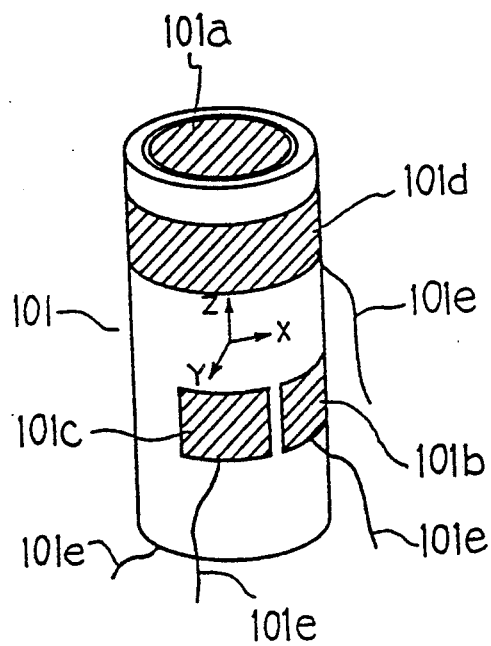
FIG. 4 is a perspective view of the fine movement element.

FIG. 4 is a perspective view of the fine movement element 101.

A common electrode 101a is formed on the inner wall of the cylindrical fine movement element and X, Y and Z electrodes 101b, 101c, 101d for bending and contracting and extending the fine movement element in the X, Y and Z directions, respectively, are formed on the outer wall. The lead wires 101e are connected to these electrodes. The group of these lead wires 101e are connected to the four contact pins A106 described above, respectively. In the drawing, one each X and Y electrodes are shown formed but it is also possible to form another X electrode and Y electrode on the opposite outer peripheral surfaces in the X and Y directions so as to form the pairs, respectively. When a predetermined signal is applied between the common electrode 101a and the X, Y and Z electrodes, the fine movement element is driven and the probe 102 is minutely moved to a predetermined position. A cover 103 is conductively fixed to the support plate 109 by bonding or the like to constitute the fine movement element block 1. The cover 103 is disposed as a safety shield against the voltage applied to the fine movement element 101 and also as a shield for preventing noise by the driving voltage to the tunnel current.

A ring member 113 as a support unit for supporting the fine movement element block 1 is fixed to the revolver 3 by screwing or the like. A contact A110, which is bonded in correspondence to the contact pin A106 described above, is fixed to this ring member 113 through an insulating ring 112, and a contact B111, which is bonded in correspondence to the contact pin B107, is fixed through an insulating seat 117. The lead wires 114 and 115 are extended from these contacts A110 and B111, respectively, through the revolver 3 and are connected to the STM apparatus. The fine movement element block 1 is fixed to the ring member and to the revolver when a fixing screw 116 as fixing means having a screw 116a formed thereon is fitted to the ring member 113. In other words, an outer peripheral projection 109a at the rear end of the fine movement element 1 butts against the flange 116b of the fixing screw and the block 1 is thus pushed and fixed to the ring member 113.

According to this structure, replacement of the fine movement element is extremely easy and a plurality of fine movement elements can be mounted onto the revolver 3. Incidentally, it is possible to establish engagement between a positioning pin and a guide groove formed on the fine movement element block 1 and the ring member 113, respectively, and to use the engagement for preventing the rotation and for positioning. The cover 103 need not necessarily be fixed to the fine movement element block 1 but may be clamped between the revolver 3 and the fine movement element block 1 when the latter is fixed to the former by the fixing screw 116. Furthermore, there is no problem when the ring member 113 is integral with the revolver 3.

Figure 5:
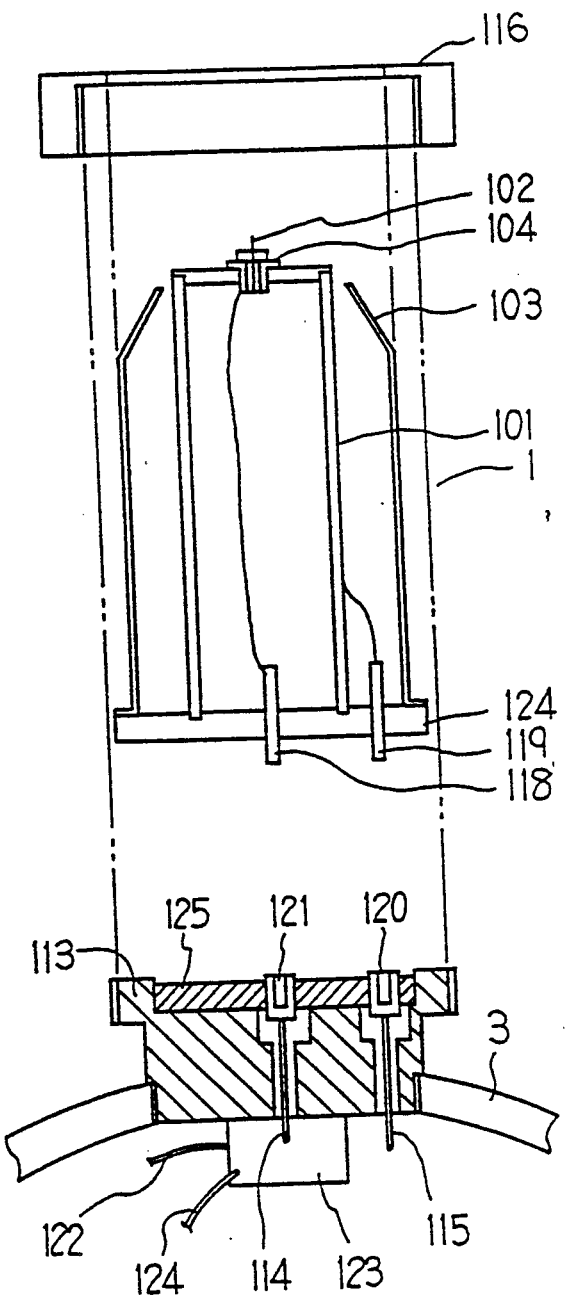
FIG. 5 is an exploded explanatory view of another embodiment of the fine movement element block.

FIG. 5 shows another example of the fine movement element block. The fine movement element 101 is fixed by adhesive or the like to a hermetic seal 124 to which the contact pins 118, 119 are fixed. Contacts 121 and 120 that fit to the contact pins 118 and 119 are fixed by the hermetic seal 125 and the fine movement element block 1 is removably fixed by the fixing screw 116 in the same way as in the foregoing embodiment. An I/V amplifier 123 for amplifying a weak tunnel current flowing through the lead wire 114 is fixed to the ring member 113 and voltage supply lines for driving the output and the I/V amplifier are extended as 122 and 124, and they can make the revolver 3 rotatable together with a voltage supply line 115 for driving the fine movement element 101 through a rotary contact inside the revolver 3.

Figure 6:
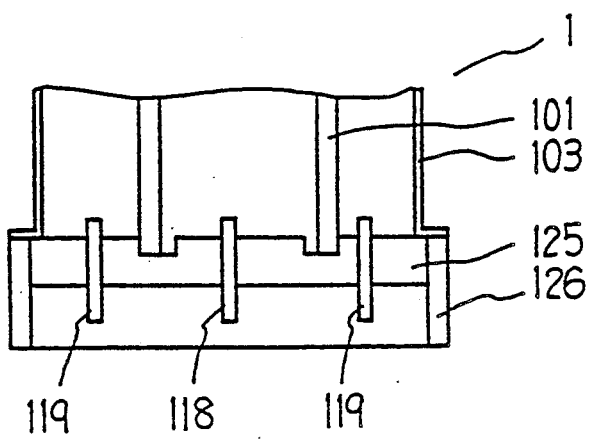
FIGS. 6A and 6B are sectional view and plan view showing another example of a connector portion.
Figure 6:
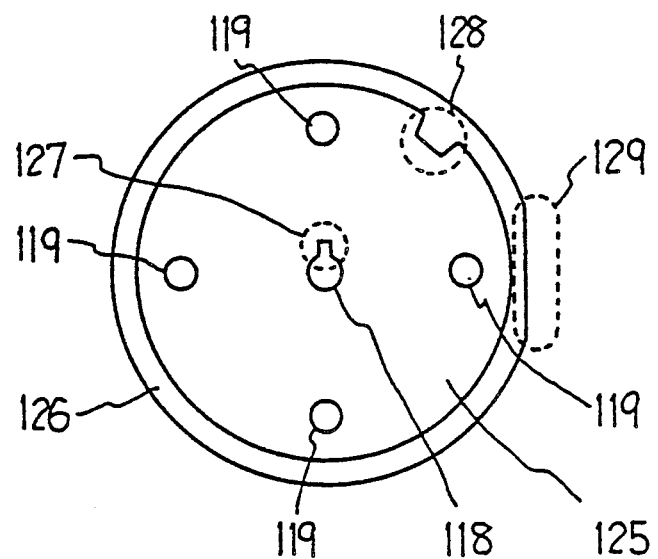

FIGS. 6A and 6B show another example of the connector portion of the fine movement element block 1. A metal ring 126 expands from the outer periphery of the hermetic seal 125 more greatly than the contact pins 118, 119 and can protect the contact pins 118, 119 when the fine movement element block 1 is placed down. The metal ring 126 functions also as a guide when inserted into the ring member 113. A notch or a pawl for positioning is formed at the socket portion of the fine movement element block 1. Though the drawing shows the pawls 127, 128 and the notch 119 by way of example, positioning or preventing of the rotation of the fine movement element block 1 at the time of fixing can be attained by forming a portion fitting to at least one of the pawls or notch on the ring member 113. The contact pin 119 is formed concentrically outside the contact pin 118. The positions of these contact pins 118, 119 may be deviated for positioning so that fitting can be made to only one position.

Since the embodiment described above uses the cylindrical fine movement element 101, its shape is equal to that of the objective lens but the shape of the fine movement element is arbitrary. For example, it may be of a cubic type as a cubic.

In accordance with the present invention described above, rough feed of the tunnel unit is provided to the stage side so that the tunnel unit main body can be constructed as the fine movement element block and the size and weight can be reduced. Therefore, it can be incorporated in the optical microscope or the laser microscope and after positioning to the desired measurement range of the sample by the optical microscope or the like, high resolution measurement can be made by STM. Furthermore, it is possible to dispose a plurality of fine movement elements having mutually different characteristics or to replace easily the fine movement element. The fine movement element block of the present invention can be assembled in an apparatus having a precision Z-stage in place of the optical microscope because it is compact in size and light in weight and can therefore be supported with high rigidity. In this manner, the present invention is extremely useful industrially.

Embodiment

Figure 7:
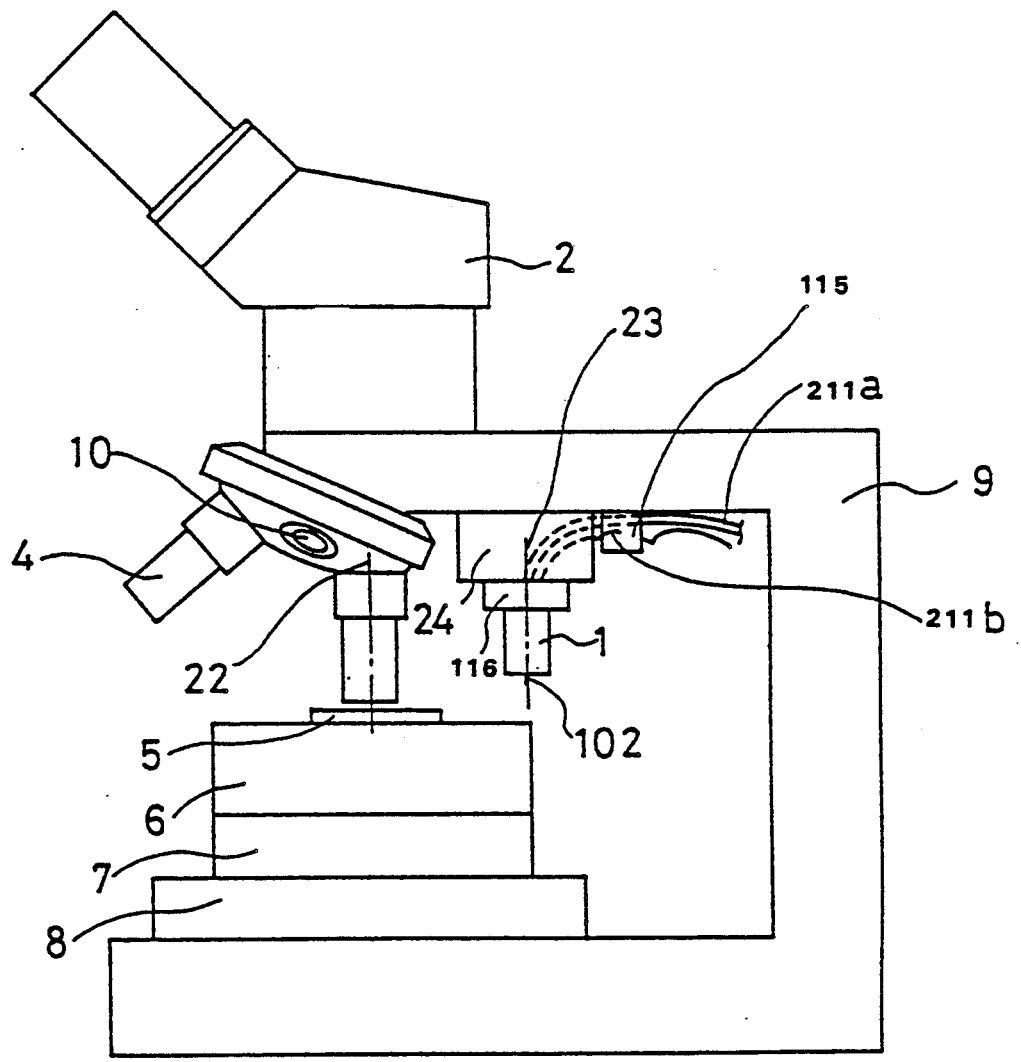
FIG. 7 is a side view of a second embodiment of the present invention.

FIG. 7 shows an embodiment 2 of the present invention. A lens-barrel 2 of an optical microscope, a revolver 3, an STM detection unit 1 and an I/V amplifier 115 are supported by an arm 9 of the apparatus. In other words, a fitting bed 24 is disposed on the arm 9 and the STM detection unit 1 is fixed to the fitting bed 24 by a set screw 116. The wirings inside the STM detection unit and the fitting bed are connected electrically and removably by terminal pins, a socket, and the like in the same way as in the embodiment 1. The I/V amplifier 115 is supported by the arm 9 in the same way as the fitting bed 24, and the fitting bed 24 and the I/V amplifier 115 are electrically connected to each other.

An objective lens 4 is fitted to the revolver 3. The relationship between the focal position of the objective lens 4 and the probe 102 at the tip of the STM detection unit 1 in the direction of height is such that the probe 102 is remoter than the sample 5 as shown in the drawing. This arrangement is directed to prevent the STM probe 102 from impinging against the sample 5 during optical microscope measurement. X- and Y-tables 7 and 8 are for moving the sample 5 in an inner plane direction and for positioning, and for causing movement between the axes at the time of optical microscope measurement and STM measurement.

A Z-table 6 is for moving the sample 5 in the direction of height, for focusing with the objective lens 4 and for effecting rough movement for STM measurement.

The positioning method is as follows. First of all, positioning of the measurement position is made by the optical microscope 2. Next, the Z-table 6 is lowered and the sample 5 is moved by the correction distance by the X- and Y-tables 7 and 8. After this operation, the portion positioned by the optical microscope 2 comes immediately below the probe 102 of the STM detection block 1. Next, auto-approach is made. That is, the Z-table 6 is approached to the probe 102 and when its entrance in the tunnel region (distance of about 1 nm between the probe 5 and the probe 102) is detected, the Z-table 6 is stopped automatically, whereby the STM measurement becomes possible. Incidentally, the correction distance described above is the gap between the optical axis 22 of the objective lens and the axis 23 of the probe 102 and this is the same as the value of the method described with reference to the embodiment 1.

According to this construction, the I/V amplifier 115 can be disposed near the STM detection unit 1 and the S/N ratio can be improved by reducing the length of the signal line 211b. Since the winding mechanism is not necessary, the construction can be simplified and rigidity can be enhanced. Furthermore, automation can be attained easily by changing the revolver 3 to an electric revolver and disposing a switch for detecting the position of a hole 10 to which the objective lens 4 is not fitted. If CCD and an electric cursor are disposed on the optical microscope in this case, all the operations after setting of the sample, that is, positioning to the desired position by use of the optical microscope, the retreat of the objective lens 4 due to the rotation of the revolver, the movement of the sample to the STM measurement position, the auto-approach and the STM measurement, can be made by use of a keyboard, and the operations after the positioning by use of the optical microscope till the auto-approach of STM can be automated fully.

Embodiment

Figure 8:
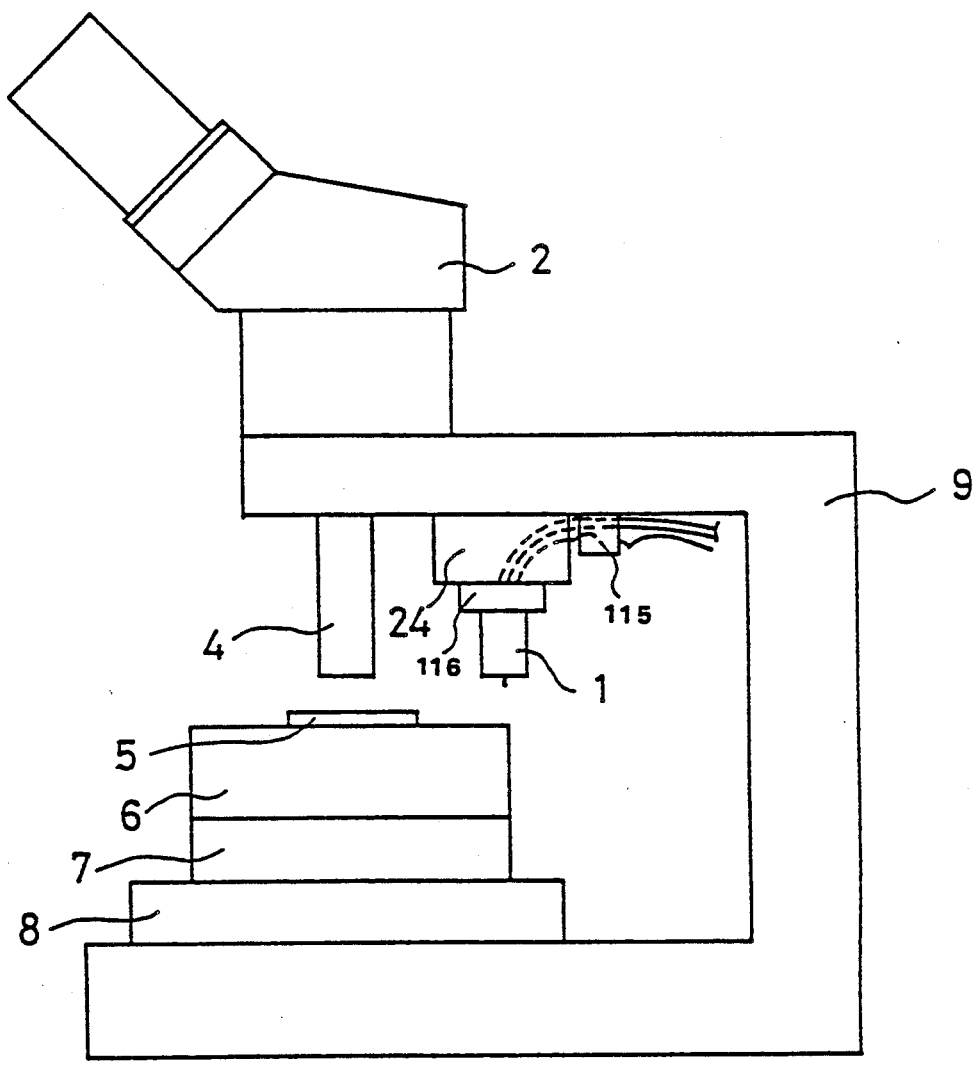
FIG. 8 is a side view of the third embodiment.
Figure 9:
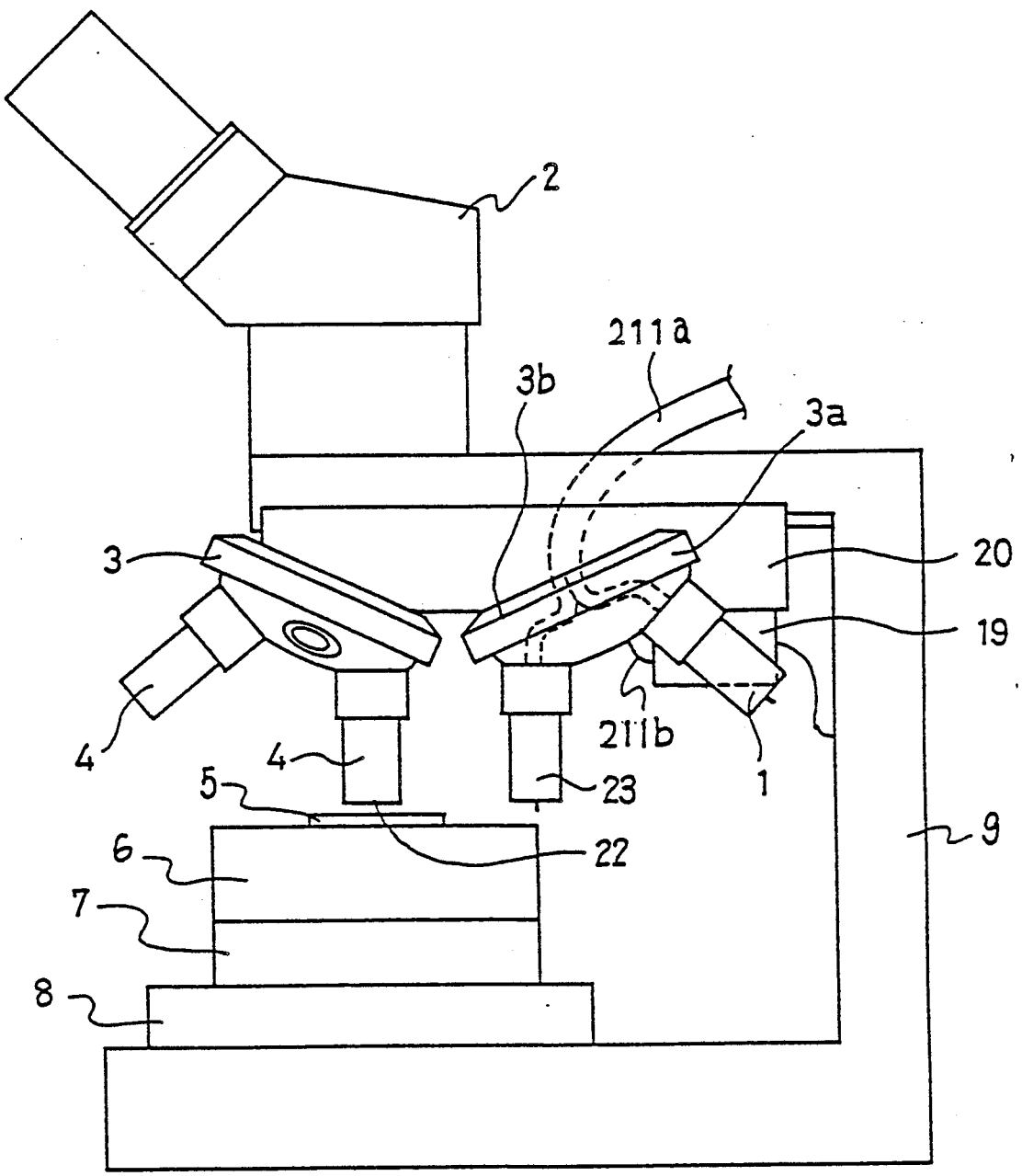
FIG. 9 is a side view of the fourth embodiment.

FIG. 8 is a side view of the third embodiment, wherein magnification of the objective lens 4 is fixed or in other words, the revolver 3 is omitted. FIG. 9 is a side view of the fourth embodiment, wherein a revolver 3b for fitting the STM detection unit is disposed on the arm 9 separately from the revolver 3a for the objective lens so that a plurality of STM detection units can be fitted to this revolver 3b. If a plurality of STM detection units can be disposed, different kinds of fine movement elements (not shown in FIG. 8, 9) for driving the probe 102 can be prepared simultaneously such as the element for atomic measurement and the element for shape measurement. If a plurality of the same kind of STM detection units are provided, it is possible to quickly satisfy, by rotation, the necessity for the replacement of the probe 102 due to its impingement, for example. In this fourth embodiment, extension of the wirings 211a, 211b of the STM detection unit 1 from the revolver 3b is made through the center of the rotary shaft of the revolver 3b. The safe positions at the time of movement of the X- and Y-stages can be secured by disposing empty hole positions, into which the STM detection unit 1 is not screwed, in the revolver 3b on the STM detection side in the same way as the revolver 3 on the objective lens side.

The STM apparatus of the embodiments described above is equipped with the X- and Y-stages for moving the sample in the X- and Y-axis directions and with the Z-stage for focusing and rough movement of STM. Therefore, STM measurement of the sample position which is positioned by the optical microscope can be carried out by moving the sample by the distance between the optical axis and the center axis of the STM detection unit by the X- and Y-stages. The great difference of the present invention from the embodiment 1 lies in that the optical axis and the STM detection unit are disposed separately from each other and the movement between them is made by the tables whereas embodiment 1 art technique rotates the revolver and sets the STM detection unit onto the optical axis. Accordingly, the drop of positioning accuracy may seem greater in embodiment 2, 3 and 4 of the present invention because positioning is made by the optical microscope and the sample is moved between the optical axis and the STM detection unit by the tables for the STM measurement as the additional step in comparison with embodiment 1 art technique. However, the probe at the tip of the STM detection unit is a kind of device which must often be replaced and moreover, in accordance with embodiment 1 art technique, too, the positions of the optical axis and the step of the STM detection unit are corrected to make positioning. This correction is effected by moving the X-Y tables as described with reference to embodiment 1 art technique. In other words, the operation which moves the X-Y tables for the purpose of correction is equally carried out both in embodiment 2, 3 and 4 of the present invention and in embodiment 1 art technique, and the moving distance is greater by only about some dozens of millimeters in embodiment 2, 3 and 4 of the present invention. When considered as position reproduction accuracy from one direction of the table (to remove back-lash), this distance is not at all different from embodiment 1 art technique.

As described above, the construction of the present invention provides extremely great effects that the S/N ratio can be improved by shortening the signal line between the STM detection unit and the I/V amplifier, the structure can be simplified because a winding mechanism of the wirings is not necessary, reproducibility of positioning can be improved because no tension acts on the wirings and automation can be made easily.

Embodiment

Figure 10:
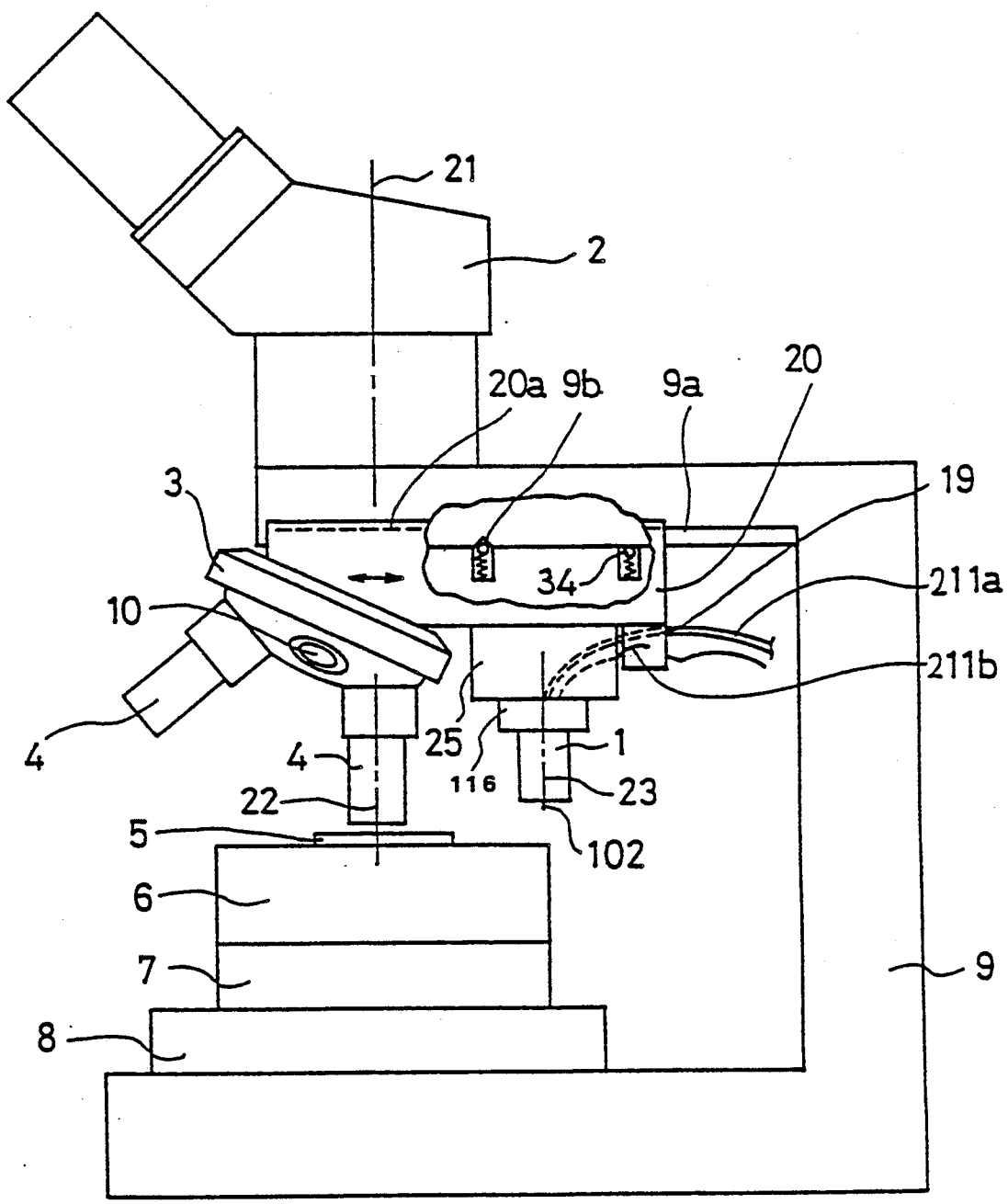
FIG. 10 shows a fifth embodiment of the invention.

FIG. 10 shows another example of positioning means. The uniaxial table 20 is supported by the arm 9 through a devotail 9a and devotail groove 20a in such a manner as to be capable of sliding in an uniaxial direction. A V-groove 9b for positioning is formed on the arm 9 and click balls 34 are biased upward by springs at two positions on the uniaxial table side so that positioning is effected when these balls are pushed into the V-groove.

When STM measurement is conducted in FIG. 10, a predetermined portion of the sample 5 is observed by the objective lens 4 and its position is aligned with the cross-cursor inside the optical microscope. It is then moved to the STM position by the uniaxial table 20 while being set to the position free from the objective lens (the position of the hole 10). Under this state, position correction of the deviation quantity between the center axis 22 of the objective lens and the center axis 23 of the STM detection unit 1, which is obtained in advance, by the X-table 7 and the Y-table 8, and auto-approach is made until a tunnel current is detected by the X-table 6. Position correction is such as the one that has been described with reference to embodiment 2.

What is claimed is:

1. A scanning tunneling microscope comprising a fine movement element block having a probe and a fine movement element is disposed removably to a revolver of a microscope and a rough movement mechanism for moving a sample in the direction of said probe is disposed on a sample stage of said microscope.

2. A scanning tunneling microscope comprising:
   a fine movement element block consisting of a probe fitted to the tip of the fine movement element, said fine movement element for driving said probe in three axial directions and a group of terminals connected to said probe and to the electrodes of said fine movement element;
   a support unit having the group of terminals disposed in such a manner as to correspond to said group of terminals; and
   fixing means for fixing said support unit and said fine movement element.

3. A scanning tunneling microscope which is an apparatus for scanning tunneling microscopy by positioning a measurement position of a sample by optical observation means, said scanning tunneling microscope comprising an objective lens and an STM detection unit are supported by a moving mechanism capable of positioning.

4. The scanning tunneling microscope according to claim 3, wherein a revolver unit capable of fixing a plurality of objective lenses is supported by said moving mechanism.

5. The scanning tunneling microscope according to claim 3, wherein a plurality of STM detection units are supported by said moving mechanism.

6. The scanning tunneling microscope according to claim 3, wherein a plurality of STM detection units are supported by said moving mechanism through a revolver in such a manner as to be capable of rotating and positioning.

* * * * *